Sept. 28, 1954  B. P. THOMPSON  2,690,030
INSECT REPELLER
Filed Nov. 1, 1949
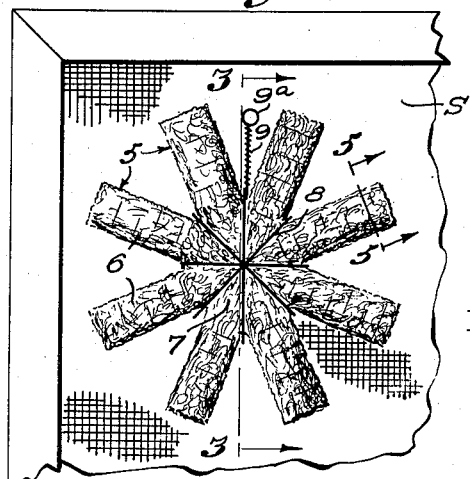
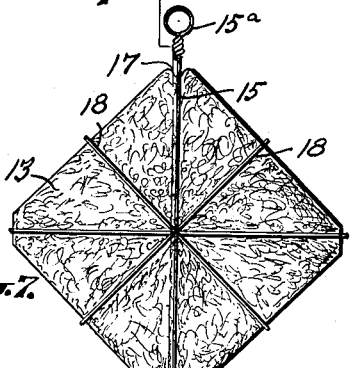
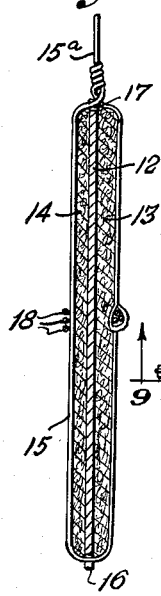
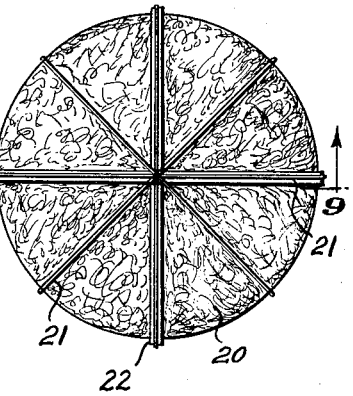
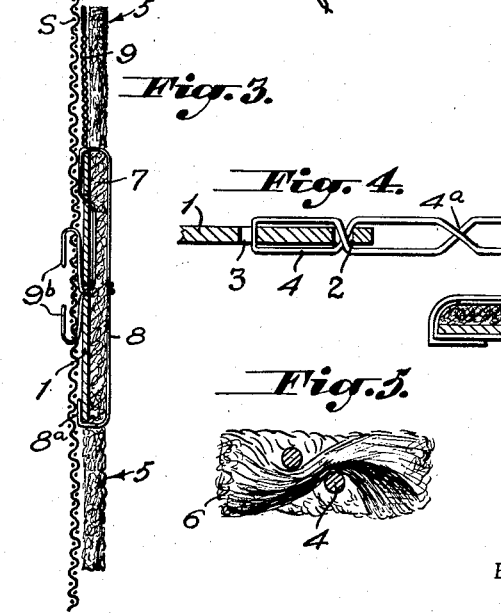
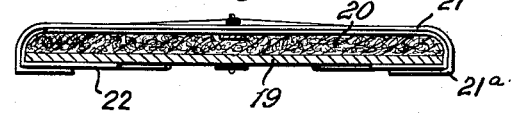
INVENTOR
Bessie Pierce Thompson
BY Elizabeth Newton Dew
ATTORNEY Patented Sept. 28, 1954

2,690,030

UNITED STATES PATENT OFFICE 2,690,030

INSECT REPELLER

Bessie Pierce Thompson, Richmond, Va.

Application November 1, 1949, Serial No. 124,917

3 Claims. (Cl. 43—132)

This invention relates to insect repellers, more particularly to devices for repelling the common household fly. It is a well-known fact that this insect is a serious and dangerous carrier of disease germs and that the incidence of certain contagious diseases is greater in areas where this pest is uncontrolled. While great strides have been made in the elimination of the fly, particularly in urban areas, such elimination is often very difficult in rural areas because of the virtual impossibility of eliminating places where the insect breeds. As a result, in rural areas, flies attracted by the odor of food gather in great numbers about the entrances to farm houses and other rural buildings, such as schools, where many gain entrance and infest or contaminate food being prepared or eaten. The problem of keeping farm dwellings free of these insects is as serious as its solution is important and difficult.

I have discovered that the fly is afraid of a mass of loose, unwoven cotton fibers, preferably white. The reason for this is that a fly, landing on such material, may become entangled in the loose fibers as in a spider's web and is unable to escape.

As a result, I have discovered that flies inherently avoid areas or localities where such material is displayed.

It is therefore the chief object of my invention to provide a device which, when displayed in and about areas such as the screen door entrances to houses, will effectively repel the flies which would otherwise congregate on and about the door both day and night and many of which would eventually find their way into the house.

Another object is to provide a device as aforesaid which is compact, durable, inexpensive, and suited to various localities of use such as on screen doors and tables.

Other objects will appear after a study of the following description in connection with the accompanying drawing wherein Figure 1 shows an elevational view of a device embodying the invention for attachment to screen doors and other screened openings, and generally spider-shaped.

Figure 2 is a detailed perspective view showing rear face of the backing card or plate and the substantially radially arranged wires by which the cotton is held in position, the cotton being omitted for clarity of illustration.

Figure 3 is a cross-section taken in a plane identified by the line 3—3 of Figure 1.

Figure 4 is a detail cross sectional view taken in a plane indicated by the line 4—4, Figure 2.

Figure 5 is a detail sectional view on the line 5—5 of Figure 1 showing how the tufts of cotton are secured in place to form the complete article or repeller.

Figure 6 is an elevation of a second or rectangular form of the invention.

Figure 7 is a cross-section taken on the line 7—7 of Figure 6.

Figure 8 shows a generally round, disc-like form, and

Figure 9 is a cross-section taken in a plane indicated by the line 9—9 of Figure 8.

Referring in detail to the drawing, and more particularly to Figures 1 through 5, the numeral 1 identifies a base comprising a circular disc of wood, fibre, plastic or metal having a plurality of pairs of holes such as 2 and 3, Figures 2 and 4, formed therein adjacent its periphery. The holes of each pair are arranged along a radius of the disc. The radii thus defined are substantially equally angularly spaced. As best illustrated at Figure 4, a wire 4 of copper or soft iron is threaded upwardly through the radially outward hole 2 then downwardly through hole 3 and back upwardly through hole 2. The two equal projecting ends are then twisted together through one or two turns as at 4a, Figure 4. Next, pieces of white cotton 6, say one to two inches long and one inch wide, are cut from a standard roll of batting. A piece of cotton with its smaller dimension radially disposed is then placed between the two wires close to the twist, and a second twist of one or two turns is then made at the other side of the piece of cotton to clamp the cotton between two substantially parallel sections of wire and secure the piece of cotton firmly in position. This procedure is repeated as many times as desired to form radial arms of cotton such as 5, Figure 1. In the model shown, eight arms are used, each consisting of four tufts or pieces of cotton. The numbers may be varied within reasonable limits.

The face of the disc 1 is then covered with ordinary household cement or glue and a circular pad 7 of cotton batting of the same approximate size as the disc 1, is cut and applied to the cement. If desired, the central circular pad 7 may be additionally protected and held in place by short lengths of wire 8 each placed diametrically across the pad and having its ends bent down about the edges of disc 1, as indicated at 8a, Figure 3.

A suspension and attaching wire 9 is twisted to form loop 9a. The ends are then threaded through holes 10 in disc 1 and the ends brought through a central aperture 11 to the back of the disc where they have substantial lengths 9b projecting and may be used to secure the device to the screen S of a door or window, as plainly shown upon Figure 3. The result is a neat and useful article having the attractive and ornamental appearance shown upon Figure 1. Since flies are afraid of spiders, the general form and shape of this species assists in frightening them away. If desired the arms 5 may be bent relatively to the central portion to more nearly simulate the form of a spider.

In Figure 6, I have shown a second square or diamond-shaped form of the invention comprising a square central plate 12, Figure 7, of wood, metal, plastic or cardboard, having correspondingly-shaped pieces of cotton 13 and 14 glued or cemented to the respective faces thereof. A supporting wire 15 extends diagonally across the plate 12, which may be truncated and notched as indicated at 16 and 17, Figure 6. A loop 15a affords a convenient way to hang the device on a hook or nail. Sections of wire 18 are looped about the devise as shown to protect the cotton pads and to secure them in place.

In Figures 8 and 9 I have shown a form of the invention comprising a round base 19, which may be of cardboard, with a round pad of batting 20 secured to one face thereof. The pad may be glued or cemented to the face of base 19 and its surface protected by length of adhesive tape 22 secured over the face of the pad each having its ends wrapped about the edges of base 19 and secured to the rear face thereof, as clearly shown in Figure 9. Bendable wires 21 of any convenient number may be used to extend over the face of the pad with their ends bent about the rim of the pad and base. When it is desired to secure this species to a screen surface, the bent ends of two of the wires 21 may be raised, protruded through the screen surface, and again bent down, to firmly mount the repeller on the screen and, at the same time, to protect the face of the pad.

While I have shown three species of the invention, other forms will become apparent after a study of the foregoing specification. For this reason I desire that the foregoing description be taken in an illustrative rather than a limiting sense; and I desire to reserve all such modifications as fall within the scope of the subjoined claims.

Having now fully disclosed the invention, what I claim and desire to secure by Letters Patent is:

1. An article of manufacture for repelling insects comprising a circular base plate, a correspondingly-shaped pad of loose white cotton fiber secured to one face of said plate, a plurality of wire arms secured to the periphery of said plate and extending radially therefrom in equally-angularly spaced relation, each said arm comprising two twisted strands having pieces of white cotton fiber secured therebetween, whereby to form a spider-shaped article, and wire means fixed to said base for attaching said article to a support.

2. An article of manufacture for repelling flies, comprising, a central circular plate having a plurality of pairs of radially-disposed holes adjacent its periphery, the radii defined by the respective pairs of holes being substantially equi-angularly disposed about said plate, a plurality of wires, each having its central portion threaded through a respective pair of holes and its end portions extending radially of said plate, a plurality of tufts of white cotton held between the radial end portions of each wire, each tuft being separated from adjacent tufts by an interposed twisting together of said wires, a pad of white cotton fibers of the same size as said plate, and means securing said pad to one face of said plate.

3. An article of manufacture comprising a base plate of regular geometrical shape, a pad of loose white cotton fibers of the same size and shape as said plate and having one side secured to a contiguous side of said base plate, said base plate being circular, a plurality of arms secured to and extending radially from said plate in regular equally angularly spaced relation thereabout, each arm comprising a pair of strands of wire twisted together at spaced intervals therealong and having a tuft of white cotton fiber clamped between the strands in the intervals between twists, to thereby form a substantially continuous radial arm of cotton fiber.

References Cited in the file of this patent

UNITED STATES PATENTS

| Number | Name | Date |
|---|---|---|
| 1,057,310 | White | Mar. 25, 1913 |
| 1,631,121 | Eckl | June 7, 1927 |
| 1,685,406 | Kimman | Sept. 25, 1928 |
| 1,757,228 | Albertson et al. | May 6, 1930 |
| 1,759,359 | Lennox | May 20, 1930 |
| 1,887,477 | Slater | Nov. 8, 1932 |
| 1,916,982 | Jones | July 4, 1933 |
| 1,980,754 | Henning et al. | Nov. 13, 1934 |
| 1,992,648 | Browne | Feb. 26, 1935 |
| 1,998,244 | Lang | Apr. 16, 1935 |

OTHER REFERENCES

Chemical Insect Repellants and Attractants, by V. G. Dethier, pages 201, 202 and 203. Published 1947 by the Blakiston Co., Philadelphia, Pa.